United States Patent [19]

Messelhi

[11] Patent Number: 4,932,744
[45] Date of Patent: Jun. 12, 1990

[54] CLOSURE FOR OPTICAL FIBER SPLICE CONNECTORS

[75] Inventor: Selim Messelhi, Etobicoke, Canada

[73] Assignee: Communications Technology Corporation, Dallas, Tex.

[21] Appl. No.: 253,147

[22] Filed: Oct. 4, 1988

[51] Int. Cl.$^5$ .............................................. G02B 6/36
[52] U.S. Cl. .................................................. 350/96.2
[58] Field of Search ................... 350/96.2, 96.21, 96.23

[56] References Cited

U.S. PATENT DOCUMENTS

| 4,761,052 | 8/1988 | Buekers et al. | 350/96.2 |
| 4,787,703 | 11/1988 | Tomko et al. | 350/96.2 |
| 4,799,757 | 1/1989 | Goetter | 350/96.21 X |
| 4,805,979 | 2/1989 | Bossard et al. | 350/96.21 X |

FOREIGN PATENT DOCUMENTS

| 60-153005 | 8/1985 | Japan | 350/96.2 |
| 2176907 | 1/1987 | United Kingdom | 350/96.23 |

Primary Examiner—John D. Lee
Assistant Examiner—John Ngo
Attorney, Agent, or Firm—Crutsinger & Booth

[57] ABSTRACT

An optical fiber splice closure (10) to protect splice connectors which secure optical fibers (18–19) together which includes top and bottom housing segments (20 and 50) which contain a body of sealant. An organizer tray (70) having guide surfaces (75) facilitates forming a loop in optical fibers (18 and 19) such that the loop has a minimum radius of at least two inches to minimize transmission losses. Flowable sealant in the housing segments has a volume greater than the volume of the closure so that sealant flows to form a waterproof seal against ingress of moisture into the closure.

7 Claims, 7 Drawing Sheets

CLOSURE FOR OPTICAL FIBER SPLICE CONNECTORS

BACKGROUND OF THE INVENTION

1. Field of the Invention

The invention relates to a closure for optical fiber splice connectors and, in particular, to a new and improved closure for optical fiber splice connectors suitable for burying in the ground and protecting the splice from moisture, electrical arcing and mechanical damage.

2. Description of the Prior Art

Waterproof optical fiber cable for use in a communications system may include one or more optical fibers surrounded by a buffer material which is generally surrounded by a sheath and an outer waterproof insulated jacket. Fiber optic connectors, for example of the type disclosed in U.S. Pat. No. 4,752,111 are employed for connecting ends of individual fibers in a first cable with ends of individual fibers in a second cable for forming a splice when it is necessary to join cable segments together to form for example a telephone cable. Since integrity of the cable is breached at the end exposing the fibers for forming the splice, it is desirable to provide some type of electrical insulation and mechanical protection for the splices and cable ends. The provision of a protective closure is particularly desirable when the cables are buried underground.

The service wire splice enclosure disclosed in U.S. Pat. No. 4,337,374 for conventional electrical cables used in telecommunication systems is in wide spread use for protecting splices in cables buried underground. However, a suitable splice enclosure for an optical fiber splice, offering the advantages of the service wire splice enclosure disclosed in Pat. No. 4,337,374, has not been developed.

SUMMARY OF THE INVENTION

The optical fiber splice closure to protect splice connectors described herein generally comprises an organizer tray, having curved guide surfaces formed thereon, to facilitate handling and supporting optical fibers after stripping insulation material from a substantial length of each end of the cable segments which are to be spliced. The guide surfaces allow individual fibers to be laid on the organizer tray while assuring that the minimum radius of a loop of optical fiber is at least two inches such that there is no substantial transmission loss resulting from bending the fibers. The organizer tray is provided with connectors for a plurality of connector trays in which conventional rotary optical fiber connectors or fusion optical fiber connectors are detachably secured.

A pair of closure housing segments, each being partially filled with a body of flowable sealant, is provided for use with the organizer tray. After cable ends are secured to opposite ends of the organizer tray and individual fibers are connected, the organizer tray is positioned in one of the housing segments and the other housing segment is urged downwardly over the organizer tray and the first housing segment causing the sealant to flow to completely encapsulate the fiber optic connectors and to force sealant through all openings into the closure thereby preventing ingress of moisture between the housing segments into the closure.

In the preferred embodiment, inter-engaging elements for locking the housing segments together are provided.

DESCRIPTION OF THE DRAWING

Drawings of a preferred embodiment of the invention are annexed hereto so that the invention may be better and more fully understood, in which.

Numeral references are employed to designate like parts throughout the various figures of the drawing.

DESCRIPTION OF A PREFERRED EMBODIMENT

Figure 1:
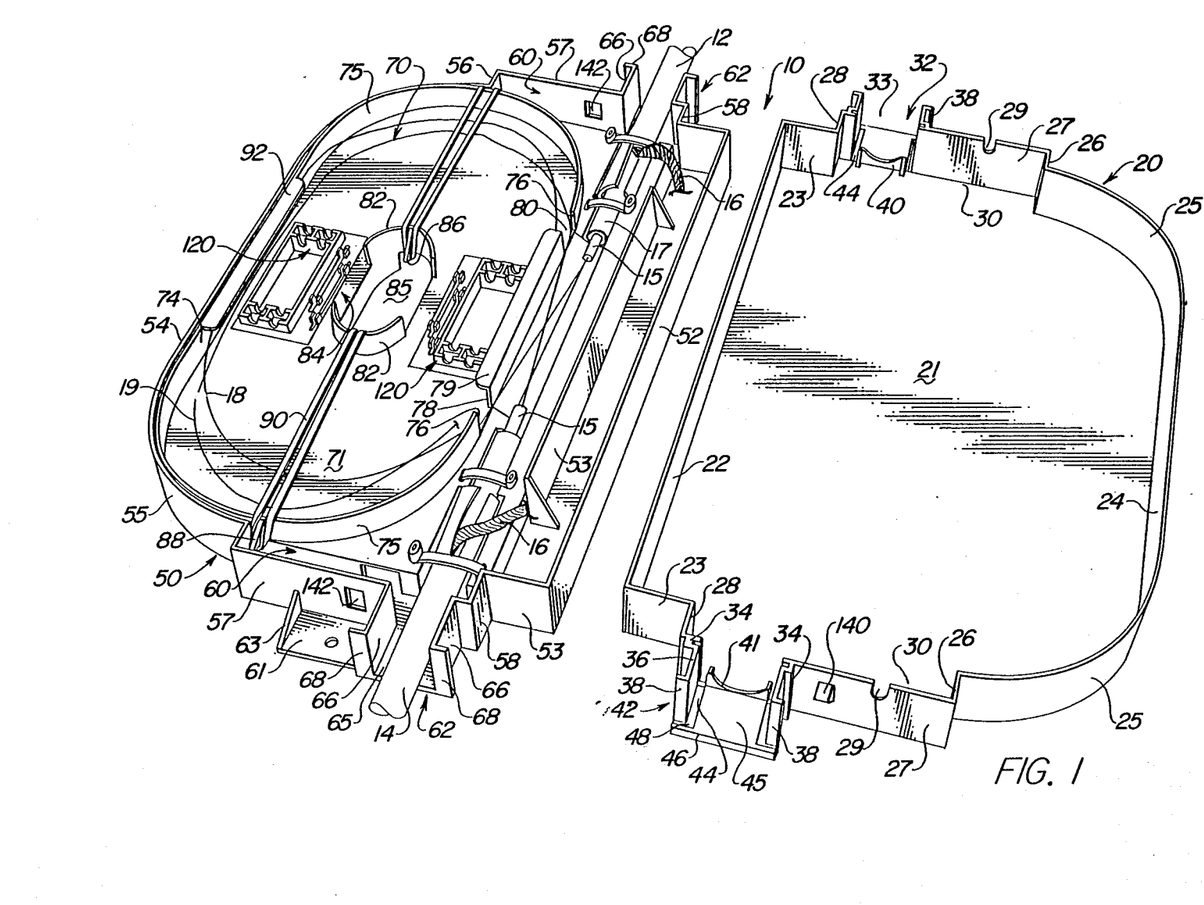
FIG. 1 is a perspective view of the optical fiber splice closure, the top housing segment being removed to illustrate the organizer tray sitting in the bottom housing segment.

Referring to FIG. 1 of the drawing, the numeral 10 generally designates an optical fiber splice closure embodying the invention. Optical fiber splice closure 10 generally comprises a top housing segment 20, a bottom housing segment 50 and an organizer tray 70. In FIG. 1 of the drawing, top housing segment 20 is disengaged from bottom housing segment 50 to illustrate the details on construction of organizer tray 70 and its relationship to bottom housing segment 50. For assembly of top housing segment 20 and bottom housing segment 50 to form a closure around organizer tray 70, top housing segment 20 would be rotated through approximately 180 degrees and moved downwardly over bottom housing segment 50.

Referring to FIGS. 1, 2-6 and 18 of the drawing, top housing segment 20 comprises a generally flat top wall 21 having generally planer upper and lower surfaces.

A front wall 22 is secured to one edge of top wall 21 and a rear wall 24 extends longitudinally along the opposite edge thereof intersecting rear wall curved transition sections 25. End wall segments 26 and 28 extend generally parallel to front wall 22 and rear wall 24 and intersect a transversely extending end wall 27. Transversely extending wall portions 23 extend inwardly from opposite ends of front wall 22 and intersect with end wall segments 28 to form a generally D-shaped periphery around top housing segment 20.

As best illustrated in FIGS. 1 and 7-10 of the drawing, bottom housing segment 50 has a shape and configuration similar to that of top housing segment 20. For assembly of top housing segment 20 and bottom housing segment 20 to form a closure around organizer tray 70, top housing segment 50 would be rotated through approximately 180 degrees from the position illustrated in FIG. 1 and moved downwardly over bottom housing segment 50.

Referring to FIGS. 2-6 of the drawing, bottom housing segment 50 comprises a generally flat bottom wall 51 having generally planer upper and lower surfaces.

A front wall 52 extends along one edge of bottom wall 51 and a rear wall 54 extends along the opposite edge thereof intersecting curved rear wall transition sections 55. End wall segments 56 and 58 extend generally parallel to front wall 52 and rear wall 54 and intersect a transversely extending end wall 57. Transversely extending wall portions 53 extend inwardly from opposite ends of front wall 52 and intersect with end wall segments 58 to form a generally D-shaped periphery around top housing segment 50. Walls of the bottom housing segment 50 extend inside of and are telescopically received walls of top housing segment 10.

Figures 3, 4:
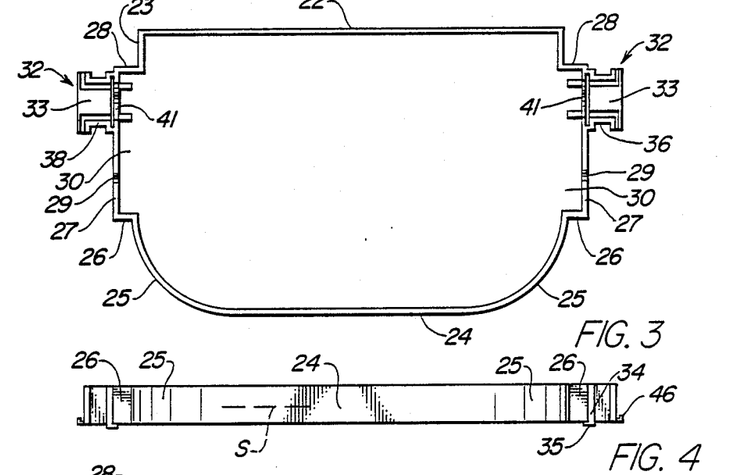
FIG. 3 is a bottom view of the top housing segment.
FIG. 4 is a rear elevational view of the top housing segment.
Figure 5:
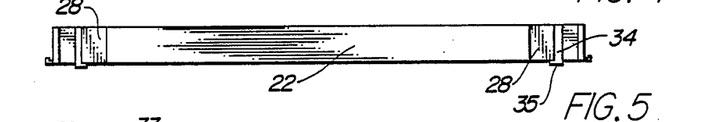
FIG. 5 is a front elevational view of the top housing segment.
Figure 6:
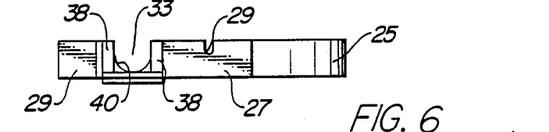
FIG. 6 is an end view of the top housing segment.
Figure 7:
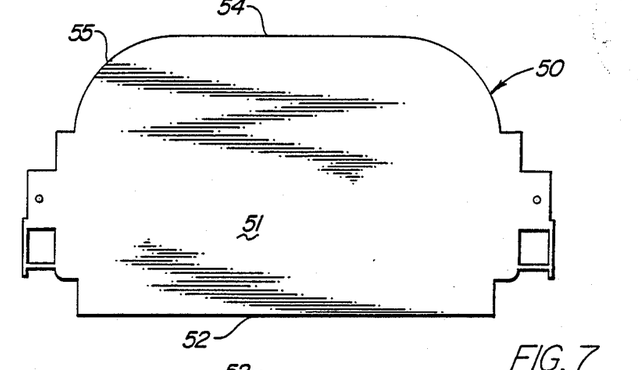
FIG. 7 is a bottom plan view of the bottom housing segment.
Figure 8:
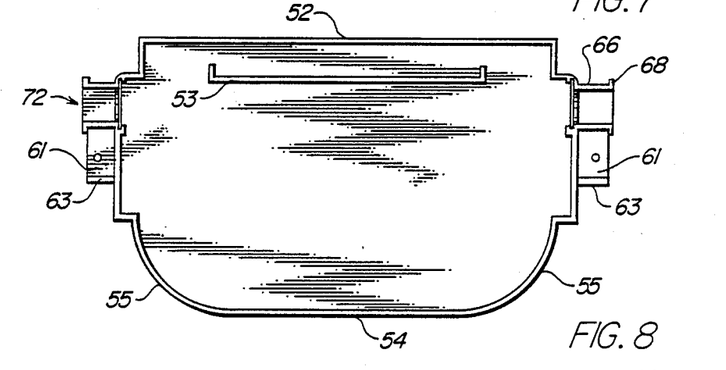
FIG. 8 is a top plan view of the bottom housing segment.
Figure 18:
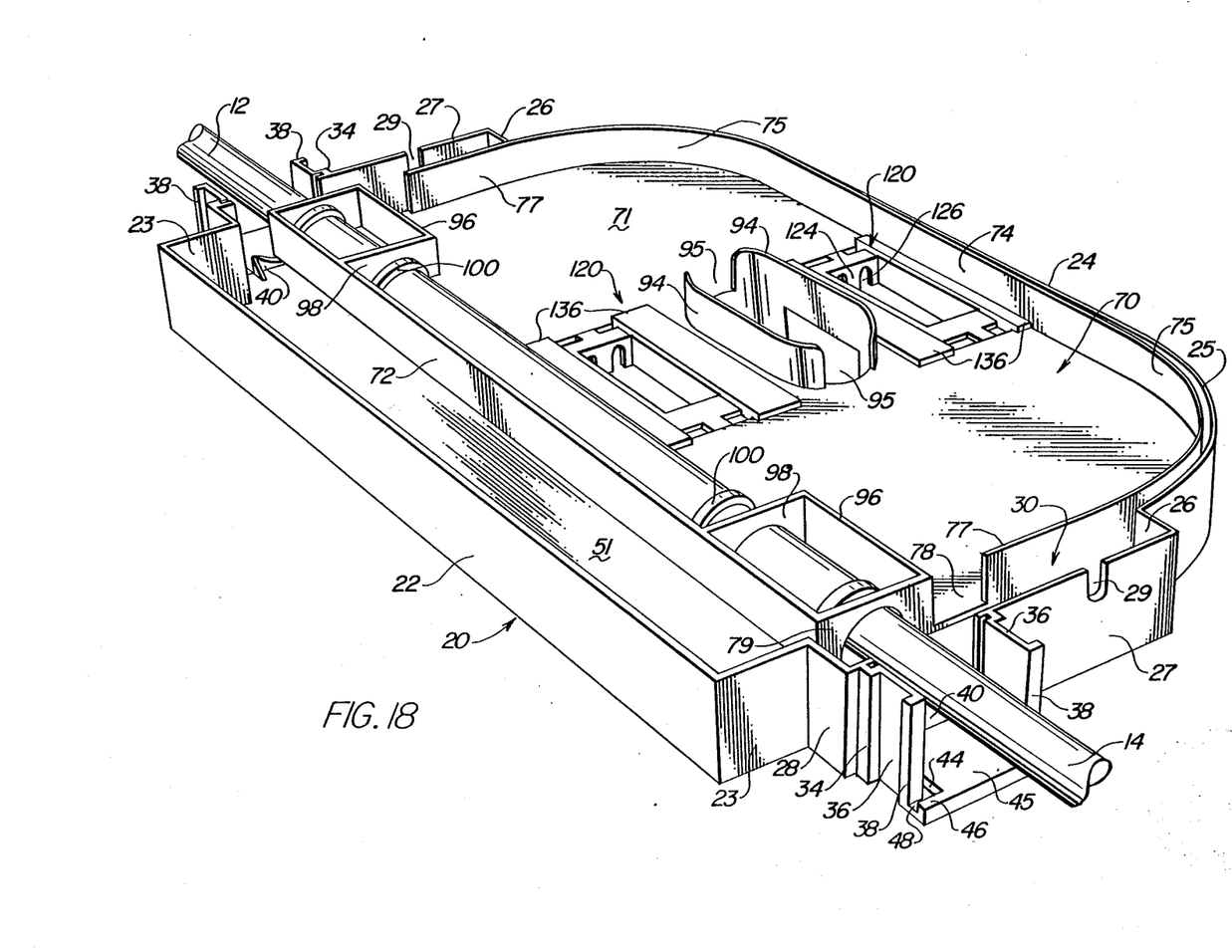
FIG. 18 is a perspective view of the bottom of the organizer tray.
Figure 19:
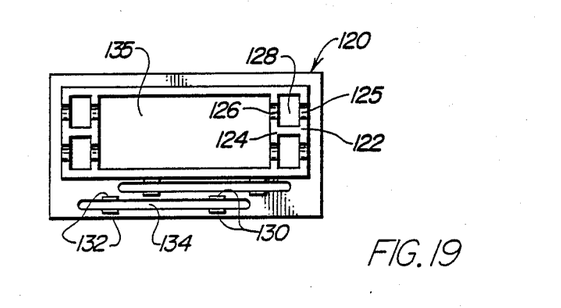
FIG. 19 is a top plan view of the connector tray.
Figure 20:
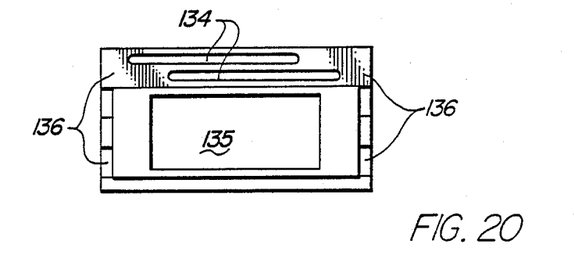
FIG. 20 is a bottom view of the connector tray.
Figure 21:
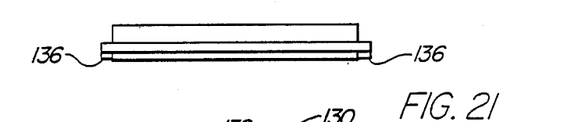
FIG. 21 is a front elevational view of the connector tray.
Figure 22:
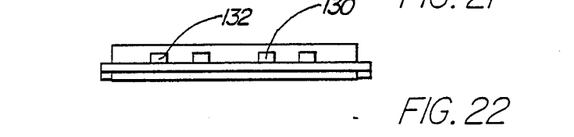
FIG. 22 is a rear elevational view of the connector tray.
Figure 23:
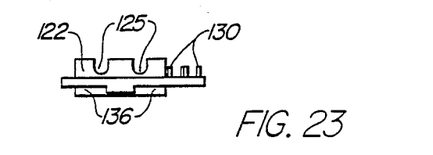
FIG. 23 is an end view of the connector tray.

As best illustrated in FIGS. 1, 3 and 18 of the drawing, entrance sections generally designated 32 and 42 are formed adjacent opposite ends of top housing segment 20 and end wall portions 26, 27 and 28 are shaped and configured to form a vestibule 30 between each entrance section 32 and 42 and the interior of top housing segment 20.

Figure 2:
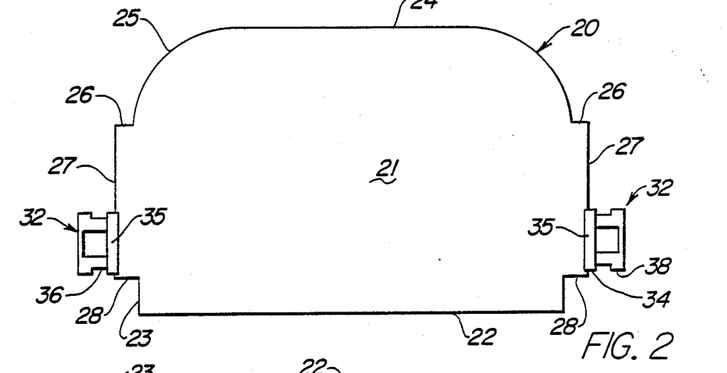
FIG. 2 is a top plan view of the top housing segment.

Entrance sections 32 and 42 are of substantially identical construction and each comprises a thickened side wall portion 34 connected between end wall segments 27 and 28 and intersect with a thickened transversely extending portion 35, as best illustrated in FIG. 2. Spaced projections 36 extend outwardly from thickened portions 34 in a direction generally parallel to front wall 22 and are provided with outwardly turned flanges 38 at the outer ends thereof.

A partition 40 having a curved upper surface 41 extends transversely across entrance passages 33 between projections 36. However, partition 40 is shorter than the width of entrance passage 33 leaving a groove 44 adjacent opposite ends thereof as will be hereinafter more fully explained.

As best illustrated in FIGS. 2 and 18 of the drawing, a top wall extends between projections 36 and has an indented portion formed on the outer surface thereof and a thickened wedge-shaped portion 45 formed on the inner surface thereof, as best illustrated in FIG. 1. Wedge-shaped portion 45 extends outwardly from partition 40 and decreases in cross section in a direction toward flanges 38. An upwardly extending lip 46 is formed on the outer extremity of wedge-shaped portion 45 forming a groove 48 which intersects with groove 44 extending between the ends of partition 40 and side projections 36.

As best illustrated in FIG. 1 of the drawing, bottom housing segment 50 has entrance sections 62 adjacent opposite ends thereof comprising a pair of generally flat outwardly extending projections 66 having out-turned flanges 68 adjacent opposite ends thereof. A bottom wall 65 extends between projections 66.

When top housing segment 20 is rotated through 180 degrees from the position illustrated in FIG. 1 and positioned vertically above bottom housing segment 50 projections 66 are received between projections 36 and upper edges of projections 66 and out-turned flanges 86 are received in grooves 44 and 48 and top-housing segment 20. Out-turned flange 38 on upper housing segment 20 will thus be positioned adjacent to and parallel to out-turned flange 68 on bottom housing segment 50. The shape and configuration of entrance sections 42 and 62 form an entrance passage wherein the projections are locked together to provide structural reenforcing by the interlocking members.

If it is deemed expedient to do so, closure 10 may be mounted on a pedestal rather than underground. A mounting plate 61 extends outwardly from one of the side projections 66 on entrance section 62 and is secured to a lower edge of end wall 57 and a filet 63 extends upwardly from mounting plate 61 and is secured to end wall 57.

From the foregoing, it should be readily apparent that the shape and configuration of top housing segment 20 is very similar to that of bottom housing segment 50. However, bottom housing segment 50 has a partition 53 spaced from and extending generally parallel to front wall 52.

Figure 17:
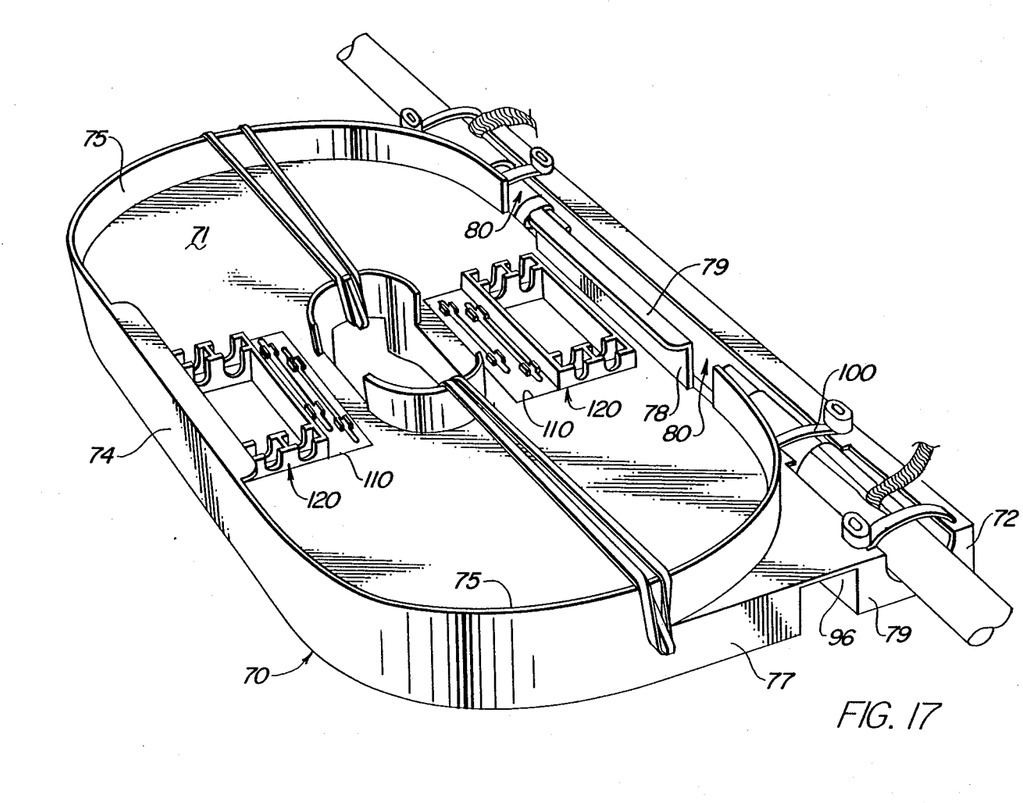
FIG. 17 is a perspective view of the top of the organizer tray.

As best illustrated in FIGS. 17 and 18 of the drawing, organizer tray 70 has a generally flat central wall portion 71. A front wall 72 extends downwardly from the front edge of central wall 71. A rear wall 74 extends both upwardly and downwardly from central wall 71 such that central wall 71 intersects a central portion of rear wall 74. As illustrated in FIG. 1 of the drawing, when organizer tray 70 is positioned in lower housing segment 50, rear wall 74 lies adjacent to and is parallel with rear wall 54 of bottom housing segment 50. When top housing segment 20 is positioned over bottom housing segment 50, rear wall 24 is positioned adjacent to and is parallel to rear wall 54. It should be readily apparent that rear wall 74 on organizer tray 70 engages the bottom surface 51 on bottom housing segment 50 and engages top wall 21 on top housing segment 20 to maintain central wall 71 on organizer tray 70 such that it extends transversely across the interior of the closure.

Curved wall segments 75 are connected to opposite ends of rear wall 74. As illustrated in FIG. 1 of the drawing, curved wall segment 75 on the upper surface of central wall 71 is substantially semi-circular forming a semi-circular guide surface. The curved semi-circular guide surface 75 terminates as indicated at 76. A partition 78 having a flange 79 on the upper end thereof extends upwardly from central wall 71 and has opposite ends which terminate in spaced apart relation from the ends of ends 76 of curved end surfaces 75 forming a pair of entrance passages 80.

Figure 12:
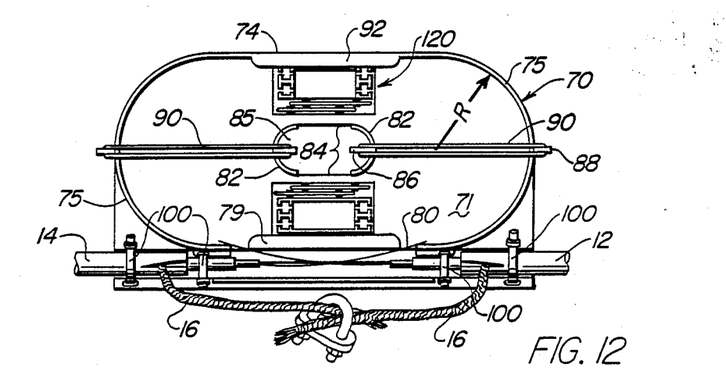
FIG. 12 is a top plan view of the organizer tray.
Figure 13:
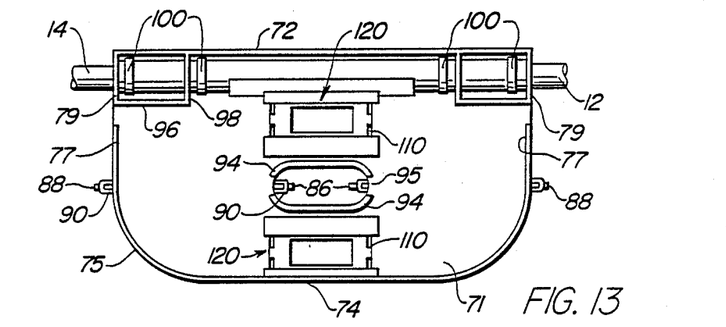
FIG. 13 is a bottom view of the organizer tray.
Figure 14:
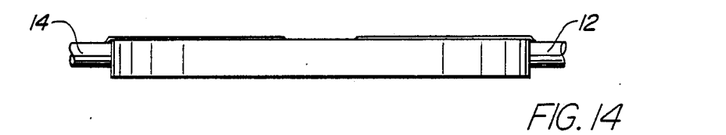
FIG. 14 is a rear elevational view of the organizer tray.
Figure 15:
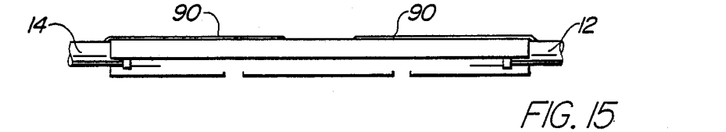
FIG. 15 is a front elevational view of the organizer tray.
Figure 16:
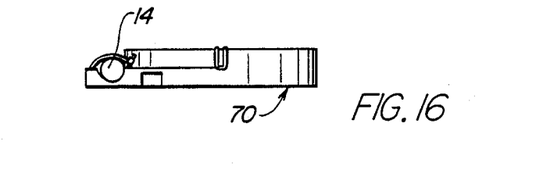
FIG. 16 is an end view of the organizer tray.

As illustrated in FIG. 12 of the drawing, the radius "R" of curved end walls 75 extending upwardly from central wall 71 is preferably in a range between about two inches and three inches.

Semi-circular shoulders 82 extend upwardly from a central portion of central wall 71 and are spaced apart to form passages 84 adjacent opposite sides of a central opening 85 which extends through central wall 71. Anchors 86 are formed on the concave surface of semi-circular guide shoulders 82 and anchors 87 are formed on the convex outer surface of curved guide surfaces 75. A rubber band 90 extends between anchors 86 and 88 to hold down optical fibers as will hereinafter be more fully explained.

A ledge 92 extends inwardly from rear wall 74.

Referring to FIG. 1 of the drawing, first and second fiber optic cables 12 and 14 are secured to the organizer tray, as will be hereinafter more fully explained. The waterproof outer protective surface of each cable 12 and 14 is cut away exposing electrically conductive wire shielding 16 and exposing optical fibers 18 and 19. As illustrated in FIG. 1, the optical fiber 18 from the first cable 12 is positioned through opening 80 and wrapped in a generally clockwise direction as viewed in FIG. 1. Optical fiber 19 from the second cable 14 is extended through the opening 80 at the opposite end of partition 78 and is wrapped in a generally counterclockwise direction in the organizer tray. Fibers 18 and 19 extend below ledges 79 and 92 and rubber bands 90 are attached between anchors 86 and 88 for holding the fibers 18 and 19 adjacent to central wall 71 on organizer tray 70.

Ledges 79 and 92, upper edges of guide surfaces 75 and upper surfaces of semi-circular shoulders 82 lie in a common plane and engage the inner surface of top wall 21 of top housing segment 20 to provide structural support for top wall 21.

Referring to FIGS. 3 and 18 of the drawing, elongated shoulders 94 extend downwardly from central wall 71 on organizer tray 70 and have spaced ends forming openings 95 therebetween. And extend along front and rear edges of the central opening 85 extending through central wall 71. It should be readily apparent that sealant may flow freely from the bottom housing segment 50 through passage 95, opening 85 and through openings 84 to the opposite side of central wall 71. Conversely, sealant may flow from upper housing segment 20 through passage 84, central opening 85 and passage 95 to the lower side of central wall 71. Thus, the interior of the closure formed by housing segments 20 and 50 is divided into upper and lower compartments by central wall 71 of organizer tray 70 and the upper and lower compartments are in fluid communication through central opening 85.

On the bottom of organizer tray 70 an end wall 77 extends tangentially from each curved portion of rear wall 75 and extends generally parallel to end walls 27 and 57 of housing segments 20 and 50, respectively. As best illustrated in FIG. 18 end wall 77 terminates to form an opening 78 which communicates with the vestibule 60 and 30 of the respective housing segments such that sealant will be forced through openings 78 into the vestibule portion of the closure adjacent opposite ends thereof and through space between cables 14 and walls bounding the entrance sections into the closure.

As illustrated in FIGS. 1 and 18 of the drawing, end walls 27 on upper housing segment 20 has a notch 29 formed therein into which filet 63 on bottom housing segment 50 extends when the housing segments are positioned in overlying relation.

As illustrated in FIG. 18, box-like members are formed between end wall 79 which extends transversely of front wall 72 and intersects with a wall 96 which in turn intersects a wall 98. Walls 79 and 98 have openings formed therein to receive fiber optic cables 12 and 14 respectively. Conventional derby connectors or tie-wrap 100 is employed to secure cables 12 and 14 to the organizer tray 70. Central wall 71 of organizer tray 70 terminates at walls 96 and 98 forming hollow openings extending through the box bounded by walls 72, 79, 96 and 98 through which sealant may flow.

Generally rectangular shaped openings 110 are formed in central wall 71 to receive connector trays 120 which are removably secured in the openings. Connector trays 120 are best illustrated in FIGS. 1 and 19-23 of the drawing. In the illustrated embodiment, connector tray 120 is of generally rectangular configuration and is formed with spaced parallel upwardly extending lugs 122 and 124 having recesses 125 and 126 formed therein to receive conventional rotary type fiber optic connectors of the type commercially available.

In the illustrated embodiment, pairs of lugs 130 and 132 are formed on connector tray 120 for receiving a conventional fusion fiber optic connector of the type commercially available.

Passages 128 and slots 134, formed through connector tray 120, and a central opening 135 permit free flow of sealant through connector tray 120 to assure that fiber optic connectors (not shown) will be encapsulated in the sealant. Latching lugs 136 are formed on the lower surface of each collector tray 120 and engage central wall 71 adjacent the periphery of openings 110 for securing connector trays 120 to the central wall 71.

Figure 9:
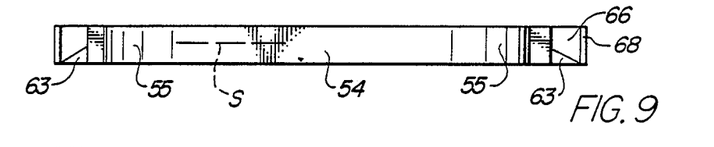
FIG. 9 is a rear elevational view of the bottom housing segment.
Figure 10:
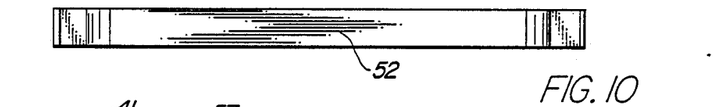
FIG. 10 is a front elevational view of the bottom housing segment.
Figure 11:
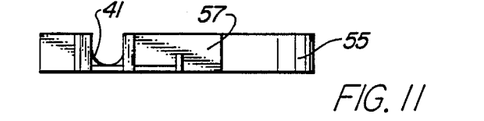
FIG. 11 is an end view of the bottom housing segment.

A quantity of sealant is positioned in top housing segment 20 and bottom housing segment 50 to a level indicated by the letter S and in FIGS. 4 and 9 of the drawing. The sealant may be a conventional product and typically is a silicone grease having good electrical insulating properties and not miscible with water. The sealant should be of a gel or grease-like consistency and be a material which does not set up but rather stays flowable during the normal life expectancy of the splice.

Preferably, the total volume of sealant placed in the housing segments is greater than the volume of the resulting compartment with the organizer tray 70 and spliced cables therein. In use, these spliced cables are positioned on the organizer tray 70. The workmen can visually observe that the connectors and connections of the cables are secured to the organizer tray. Then the organizer tray 70 is positioned in the bottom housing segment 50 as illustrated in FIG. 1 of the drawing and top housing segment 20 is inverted and placed over the bottom housing segment 50. The top housing segment 20 is pushed downwardly onto the bottom housing segment such that excess sealant flows to completely encapsulate the exposed optical fibers, to equalize pressure on opposite sides of the organizer tray and to force excess sealant into the entrance passages 33 to provide additional moisture proofing around the cables 12 and 14. Lugs 140 on top housing segment 20 snap into openings 142 on bottom. housing segment 50 for locking the segments together. This completes the making of the splice and the enclosure and preparation of the splice for burial.

I claim:

1. An optical fiber splice closure to protect splice connectors securing optical fibers together comprising: a pair of housing segments; an organizer tray; guide surfaces on said organizer tray to form a loop in an optical fiber such that the loop has a predetermined minimum radius; means for securing splice connectors to said organizer tray; a body of flowable sealant in each of said housing segments; and means securing said housing segments to form a closure around said organizer tray, the volume of said body of sealant being greater than the volume of said closure such that sealant flows to form a waterproof seal around said organizer tray and to encapsulate the splice connectors in said body of sealant.

2. An optical fiber splice closure according to claim 1, said guide surfaces comprising: semi-circular end walls on said organizer tray.

3. An optical fiber splice closure according to claim 2, with the addition of: a rear wall extending between said semi-circular end walls.

4. An optical fiber splice closure according to claim 3 with the addition of: a ledge on said rear wall, said ledge and edges of said semi-circular end walls lying in a common plane.

5. An optical fiber splice closure according to claim 4 with the addition of a partition extending between said semi-circular end walls; and a ledge on said partition, said partition and said ledge on said partition being shaped and configured to prevent arcing between conductive shielding on an optical fiber cable and splice connectors joining fibers of the cable segments, said ledge on said partition lying in said common plane.

6. An optical fiber splice closure to protect splice connectors securing optical fibers together comprising: housing segments; an organizer tray; semi-circular guide surfaces on opposite ends of said organizer tray to form a loop in an optical fiber such that the loop has a minimum radius of at least two inches; a rear wall extending between said semi-circular guide surfaces; a partition extending between said semi-circular guide surfaces; a ledge on said partition, said partition and said ledge on said partition being shaped and configured to prevent arcing between conductive shielding on an optical fiber cable and splice connectors joining fibers of the cable segments; a body of flowable sealant in each of said housing segments; and means securing said housing segments to form a closure around said organizer tray, the volume of said body of sealant being greater than the volume of said closure such that sealant flows to form a waterproof seal against ingress of moisture into said closure.

7. An optical fiber splice closure to protect splice connectors securing optical fibers together comprising: a pair of housing segments; an organizer tray having a central portion, said central portion having a central opening extending therethrough; semi-circular guide shoulders on said central portion, said guide shoulders extending around a portion of said central opening; semi-circular end walls on said organizer tray to form a loop in an optical fiber, said guide shoulders being configured such that the loop has a predetermined minimum radius; means extending between said end walls and said shoulders to maintain optical fibers adjacent said central portion of said organizer tray; a body of flowable sealant in each of said housing segments; and means securing said housing segments to form a closure around said organizer tray, the volume of said body of sealant being greater than the volume of said closure such that sealant flows through said central opening to form a waterproof seal against ingress of moisture in said closure.

* * * * *